Patented Feb. 16, 1943

2,311,533

UNITED STATES PATENT OFFICE 2,311,533

IRIDESCENT PLASTIC COMPOSITION

Irving Gertzog and Louis Gertzog, Rochester, N. Y., assignors to Rochester Button Company, Rochester, N. Y., a corporation of New York No Drawing. Application December 26, 1941, Serial No. 424,546

16 Claims. (Cl. 106—148)

This invention relates to the production of iridescent plastic compositions and to films and articles made therefrom.

A principal purpose of the invention is the provision of moldable or film-forming compositions having a permanent iridescence. A further purpose of the invention is the provision of a method for making articles having the nacreous appearance of mother-of-pearl.

Although a number of substances have been proposed for the purpose of giving an iridescent appearance to plastic compositions, they have suffered from various disadvantages such as lack of permanence, excessive cost, inability to withstand the processing treatments to which plastic compositions are normally subjected, and the like.

We have found that lead acid arsenate may be prepared in the form of minute crystalline leaflets which, even in relatively small amounts, impart to plastic compositions a permanent iridescent appearance, capable of withstanding the usual molding and treating operations of the plastics industry and resistant to the usual ingredients of plastic and film-forming compositions.

Lead acid arsenate in the form of fine crystalline leaflets suitable for use in the present invention may be made by the combination of lead arsenate-forming substances under suitable conditions or by the recrystallization of commercial arsenate of lead or lead acid arsenate. Several typical methods of producing lead acid arsenate having the desired leafy or plate-like crystalline structure are included in the following description:

1. 300 cubic centimeters of a 37 per cent solution of lead acetate are diluted to 750 cubic centimeters and the solution is heated to 95° C. To the hot solution is added, with stirring, a solution of 45 grams of arsenic pentoxide in 450 cubic centimeters of water, also at 95° C. The precipitate is filtered and washed with cold water; it is most conveniently stored as a paste.

Although the ranges of concentrations and temperature indicated in the example are preferable, wide variations are permissible. The concentration of the lead acetate may be varied from 5 to 40 per cent without seriously affecting the final product; the concentration of arsenic acid, expressed as per cent arsenic pentoxide, can be varied from 2 to 10 per cent without any detrimental effects. Similarly, the temperature is not limited to a narrow range but may be elevated or lowered considerably with the solubility of the arsenic pentoxide being the only limit. Any turbidity in the lead acetate solution may be removed by the addition of acetic acid.

2. 39 grams of arsenic trioxide are treated with 50 cubic centimeters of hot 70 per cent nitric acid. The solution is boiled to remove the excess acid and is then diluted to 400 cubic centimeters. The hot solution of arsenic acid is added to 750 cubic centimeters of a 15 per cent solution of lead acetate. The precipitate is further treated as previously described.

3. 39 grams of arsenic trioxide are treated with 50 cubic centimeters of hydrogen peroxide. After the initial spontaneous reaction has taken place the solution is boiled until clear and diluted to 450 cubic centimeters. The hot solution of arsenic acid is added, with stirring, to a mixture of 300 cubic centimeters of a 37 per cent solution of lead acetate, 450 cubic centimeters of water, and 10 cubic centimeters of acetic acid.

Other lead salts may be substituted for lead acetate in the foregoing examples.

4. 150 grams of commercial lead acid arsenate are dissolved in 700 cubic centimeters of 1:4 nitric acid at 95° C. The hot solution is poured into a solution of 180 cubic centimeters of concentrated ammonia in 4200 cubic centimeters of water also at 95° C. The mixture is allowed to cool and the recrystallized lead acid arsenate is filtered and washed.

A wide range of concentrations and proportions of the reagent substances in the foregoing example has been found to be permissible. In general, however, optimum yields and a highly satisfactory crystalline structure are obtained with substantially the proportions and conditions given in the example.

5. 150 grams of lead acid arsenate are dissolved in 700 cubic centimeters of 1:4 nitric acid at 95° C. The hot solution is poured into a mixture of 180 cubic centimeters of concentrated ammonia, 4200 cubic centimeters of water and 150 grams of urea. The product thus prepared has a slightly higher degree of brilliance.

The effect of the urea is believed to be purely crystallographic. The urea is apparently absorbed on the pinacoidal faces of the crystal, preventing further precipitation on these faces and thus causing the pinacoidal habit to predominate. The amount of urea used may be varied from very low concentrations to high concentrations without adversely affecting the precipitate.

The lead acid arsenate pigment produced in accordance with the foregoing examples may be introduced into a wide variety of plastic compositions, including thermosetting resin plastics, such as urea-formaldehyde compositions, casein compositions, film-forming compositions, and the like. The iridescence produced in such compositions by leafy lead acid arsenate persists through heat and pressure molding operations, mastication, treatment with formaldehyde solution, and other treatments and operations of the plastics industry. The iridescent effect is substantially increased if the plastic composition is worked in such a manner as to bring about a uniform orientation of a substantial proportion of the lead acid arsenate particles. This orientation may be effected, for example, by suitably controlling the flow of a plasticized mass of plastic composition.

Among the other advantageous properties of the foliaceous crystals of lead acid arsenate are a high degree of whiteness, a very considerable covering power and a high index of refraction. In general, a much smaller proportion of the lead acid arsenate is required to produce a desired iridescent effect than of most of the previously proposed iridescent pigments.

For the production of iridescent compositions, a suitable quantity of the foliaceous lead acid arsenate is admixed with a plastic or film-forming composition at a convenient stage in the production of the composition.

For example, 386 grams of foliaceous lead acid arsenate dispersed in 11 liters of water are added to 100 pounds of air dry casein. The mixture is masticated and extruded into rods which may be cured by immersion in formaldehyde solution and then mechanically worked into desired form or the rods may be worked into approximate or final shape of the desired articles before curing. The finished articles, particularly after polishing, for example, by a tumbling operation, exhibit a very pleasing iridescence. The material may be colored as desired by addition of the usual coloring materials. The iridescent effect may be considerably enhanced by carrying out the extrusion or molding operation in such a manner that the plastic composition is caused to flow in a direction parallel to the surface of the eventual article to be produced, thereby orienting a substantial portion of the lead acid arsenate crystals with their pinacoidal faces parallel to the surface.

The plastic composition of the invention may comprise any of the natural or artificial thermoplastic, thermosetting or hardenable substances, including the amine-aldehyde type resins, such as urea-formaldehyde condensation products, the cellulose derivatives, such as the cellulose esters, and the poly-olefine type resins, such as the acrylic acid derivatives, vinyl compounds and the like, whether in solid or semi-solid masses or dispersed in liquid media to provide film-forming compositions.

In general, an amount of foliaceous lead acid arsenate of from 0.5% to 2.5% by weight of the plastic substance will be found to give a desirable iridescent effect, the amount depending on the character of the plastic substance and the effect to be achieved.

We claim:
1. A plastic composition comprising a plastic substance, and foliaceous particles of lead acid arsenate.
2. A plastic composition comprising a plastic substance, and from about 0.5% to about 2.5% by weight of the plastic substance of foliaceous particles of lead acid arsenate.
3. A plastic composition comprising a plastic substance, foliaceous particles of lead acid arsenate, and a liquid medium for said plastic substance.
4. A plastic composition comprising a thermoplastic substance, and foliaceous particles of lead acid arsenate.
5. A plastic composition comprising a thermosetting plastic substance, and foliaceous particles of lead acid arsenate.
6. A plastic composition comprising casein and foliaceous particles of lead acid arsenate.
7. A plastic composition comprising casein and from about 0.5% to about 2.5% by weight on the casein of foliaceous particles of lead acid arsenate.
8. An article of manufacture comprising an indurated plastic substance including foliaceous particles of lead acid arsenate.
9. An article of manufacture comprising an indurated plastic substance including from about 0.5% to about 2.5% by weight of foliaceous particles of lead acid arsenate.
10. An article of manufacture comprising indurated casein including foliaceous particles of lead acid arsenate.
11. An article of manufacture comprising indurated casein including from about 0.5% to about 2.5% by weight of foliaceous particles of lead acid arsenate.
12. A method of making iridescent articles which comprises incorporating with a plastic substance foliaceous particles of lead acid arsenate and forming the mixture into the shape of an article.
13. A method of making iridescent articles which comprises incorporating with a hardenable plastic substance foliaceous particles of lead acid arsenate, hardening the mixture and forming an article therefrom.
14. A method of making iridescent articles which comprises incorporating with a hardenable plastic substance foliaceous particles of lead acid arsenate, forming the mixture into the shape of an article and hardening the formed mixture.
15. A method of making iridescent articles which comprises incorporating with casein foliaceous particles of lead acid arsenate, and forming and hardening the casein in the shape of an article.
16. A method of making iridescent articles which comprises incorporating with casein from about 0.5% to about 2.5% by weight of foliaceous particles of lead acid arsenate, and forming and hardening the casein in the shape of an article.

IRVING GERTZOG.
LOUIS GERTZOG.